United States Patent
Burgess et al.

(10) Patent No.: US 9,785,407 B2
(45) Date of Patent: Oct. 10, 2017

(54) DATA PROCESSING APPARATUS HAVING COMBINED DIVIDE-SQUARE ROOT CIRCUITRY

(71) Applicant: ARM LIMITED, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 323 days.

(21) Appl. No.: 14/549,639

(22) Filed: Nov. 21, 2014

(65) Prior Publication Data

US 2016/0147503 A1    May 26, 2016

(51) Int. Cl.
| | |
|---|---|
| *G06F 7/535* | (2006.01) |
| *G06F 7/552* | (2006.01) |
| *G06F 7/537* | (2006.01) |
| *G06F 9/30* | (2006.01) |

(52) U.S. Cl.
CPC ............ *G06F 7/535* (2013.01); *G06F 7/5375* (2013.01); *G06F 7/5525* (2013.01); *G06F 9/3001* (2013.01); *G06F 2207/5351* (2013.01); *G06F 2207/5528* (2013.01)

(58) Field of Classification Search
CPC .......... G06F 7/537–7/5375; G06F 2207/5351; G06F 2207/5354; G06F 2207/5528
USPC .......... 708/504, 650, 653, 655–656
See application file for complete search history.

(56) References Cited

U.S. PATENT DOCUMENTS

| | | | | |
|---|---|---|---|---|
| 6,847,985 B1* | 1/2005 | Gupta | ............ | G06F 7/483 708/500 |
| 7,243,119 B1* | 7/2007 | Yamada | ............ | G06F 7/535 708/650 |
| 7,921,149 B2* | 4/2011 | Uesugi | ............ | G06F 7/4824 708/490 |

OTHER PUBLICATIONS

D. Harris, S. Oberman, M. Horowitz, "SRT Division Architectures and Implementations", Proc. IEEE 13th Int'l Symp. Computer Arithmetic (ARITH13), pp. 18-25, 1997.*
Gerwig et al., "The IBM eServer z990 Floating-Point Unit", *IBM J. Res. & Dev.*, vol. 48, No. 3/4, May/Jul. 2004, pp. 311-322.

* cited by examiner

*Primary Examiner* — Matthew Sandifer
(74) *Attorney, Agent, or Firm* — Nixon & Vanderhye P.C.

(57) ABSTRACT

A processing apparatus has combined divide-square root circuitry for performing a radix-N SRT divide algorithm and a radix-N SRT square root algorithm, where N is an integer power-of-2. The combined circuitry has shared remainder updating circuitry which performs remainder updates for a greater number of iterations per cycle for the SRT divide algorithm than for the SRT square root algorithm. This allows reduced circuit area while avoiding the SRT square root algorithm compromising the performance of the SRT divide algorithm.

18 Claims, 5 Drawing Sheets

DATA PROCESSING APPARATUS HAVING COMBINED DIVIDE-SQUARE ROOT CIRCUITRY

BACKGROUND

The present technique relates to the field of data processing. More particularly, it relates to circuitry for performing a division algorithm and a square root algorithm.

A data processing apparatus may perform arithmetic operations on operands, in response to instructions. For example, a divide operation may divide an operand A by a divisor D, and a square root operation may obtain the square root of an operand B. One method for performing divide or square root operation is the SRT algorithm, named after Sweeney, Robertson, and Tocher, who each independently proposed the algorithm. Hence, circuitry may be provided for performing an SRT divide algorithm and an SRT square root algorithm in a data processing apparatus.

SUMMARY

Viewed from one aspect, the present technique provides a data processing apparatus comprising:

combined divide-square root circuitry to perform, in response to a divide instruction identifying a first operand A and a divisor D, a radix-N SRT division algorithm to generate a result value $Q=A/D$, and to perform, in response to a square root instruction identifying a second operand B, a radix-N SRT square root algorithm to obtain a result value $Q=\sqrt{B}$, where N is an integer power of 2;

wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and the combined divide-square root circuitry comprises shared remainder updating circuitry to generate the updated remainder value for a greater number of iterations per processing cycle for the SRT division algorithm than for the SRT square root algorithm.

Viewed from another aspect, the present technique provides a data processing apparatus comprising:

combined divide-square root means for performing, in response to a divide instruction identifying a first operand A and a divisor D, a radix-N SRT division algorithm to generate a result value $Q=A/D$, and for performing, in response to a square root instruction identifying a second operand B, a radix-N SRT square root algorithm to obtain a result value $Q=\sqrt{B}$, where N is an integer power of 2;

wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and the combined divide-square root means comprises shared remainder updating means for generating the updated remainder value for a greater number of iterations per processing cycle for the SRT division algorithm than for the SRT square root algorithm.

Viewed from a further aspect, the present technique provides a data processing method comprising:

in response to a divide instruction identifying a first operand A and a divisor D, performing a radix-N SRT division algorithm to generate a result value $Q=A/D$, where N is an integer power of 2; and in response to a square root instruction identifying a second operand B, performing a radix-N SRT square root algorithm to obtain a result value $Q=\sqrt{B}$;

wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and shared remainder updating circuitry is used to generate the updated remainder value $R_i$, with the shared remainder updating circuitry generating the updated remainder value for a greater number of iterations per processing cycle for the SRT division algorithm than for the SRT square root algorithm.

Further aspects, features and advantages of the present technique will be apparent from the following description of examples, which is to be read in conjunction with the accompanying drawings.

DESCRIPTION OF EXAMPLE EMBODIMENTS

Figure 1:
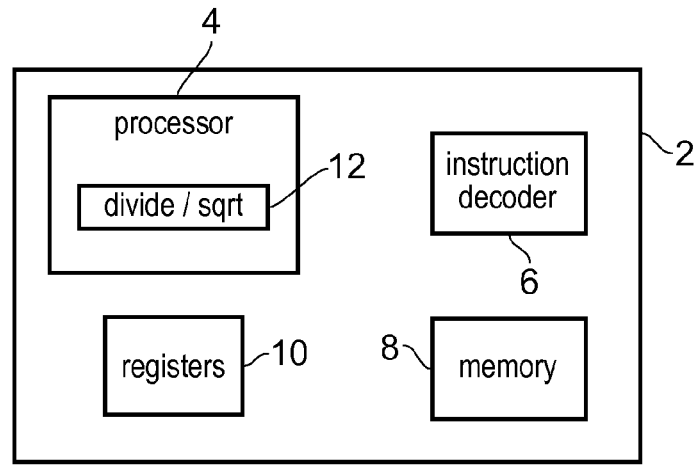
FIG. 1 schematically illustrates an example of a data processing apparatus having combined divide-square root circuitry.

The SRT division algorithm and SRT square root algorithm are similar in that they both comprise a number of iterations for determining digits of the result value Q (also referred to as a quotient value) digit-by-digit based on a remainder value R. The remainder value R is typically initialised based on the operand A or B being divided or square rooted, and then each iteration may update the previous remainder value $R_{i-1}$ to generate an updated remainder value $R_i$, which is generated based on a quotient value $q_i$ that is selected for that iteration in dependence on the previous remainder value $R_{i-1}$. The updated remainder value from one iteration then becomes the previous remainder value for a following iteration. This is repeated a number of times, and when a certain number of iterations have been performed (when enough digits have been generated), the result value is derivable from the quotient values selected in each iteration.

Since the SRT division algorithm and the SRT square root algorithm are similar, when implementing the algorithms in hardware some circuitry can be saved by providing combined divide-square root circuitry to perform the SRT division algorithm in response to a divide instruction and to perform the SRT square root algorithm in response to a square root instruction. However, in practice the SRT square root algorithm has added complexities compared to the SRT division algorithm, and so most existing systems require a significant amount of additional circuitry in order for the SRT square root algorithm to keep pace with the SRT division algorithm so that they can produce the result value Q in the same number of processing cycles for a given number of iterations. In practice, however, the additional circuitry for the SRT square root algorithm slows down the SRT division algorithm so that the greater difficulty of performing square roots compromises the performance of the combined circuitry when performing the division.

The inventors of the present technique realised that in practice it is not necessary for the SRT square root algorithm to be performed in the same number of cycles as the SRT division algorithm, and that the circuitry for performing a certain number of iterations of the SRT square root algorithm can be overlaid with circuitry for performing a greater number of iterations of the SRT divide algorithm. Therefore, by providing shared remainder updating circuitry which performs a greater number of iterations per processing cycle for the SRT division algorithm than for the SRT square root algorithm, this allows greater sharing of circuitry between the two algorithms (avoiding the need for extra circuitry for the SRT square root algorithm), to reduce circuit area. Also, this approach means that the performance of the SRT division algorithm is not held back by the additional requirements of the square root algorithm. This results in a more area efficient processing apparatus which provides improved performance for the SRT division algorithm.

More particularly, in some embodiments the shared remainder updating circuitry may perform twice as many iterations per processing cycle for the SRT division algorithm for the SRT square root algorithm. This approach is relatively efficient in circuitry since it is recognised that the circuitry for performing two iterations of the SRT divide algorithm can be overlaid exactly with the circuitry for performing a single iteration of the SRT square root algorithm, so that there is no need for additional adders which are only used for one of the two algorithms. However, it is also possible to provide other implementations, which may for example perform 3 or 5 division iterations per processing cycle and 2 square root iterations per processing cycle, in which case not all the adders provided in hardware need be used for both divide and square root iterations.

The SRT division algorithm and SRT square root algorithm may both use the same radix, namely a radix of N, where N is an integer power of 2 (that is, $N=2^X$ where X is an integer). This allows greater sharing of circuitry between the two algorithms, which provides further reductions in circuit area.

For example, quotient selecting circuitry for selecting the quotient value $q_i$ based on the previous remainder value $R_{i-1}$ may be used for both the SRT divide algorithm and the SRT square root algorithm. That is, the quotient selecting circuitry may select the quotient value $q_i$ in the same way for both algorithms. This would not be possible if the division and square root algorithms use different radixes.

In the SRT division algorithm, the $i^{th}$ iteration may determine the updated remainder value $R_i$ equivalent to $R_i=N\times(R_{i-1}-q_i\times D)$ (referred to as Equation 1 below) or $R_i=N\times R_{i-1}-q_i\times D$ (referred to as Equation 2), where N is the radix value, $R_{i-1}$ is the previous remainder value, $q_i$ is the quotient value selected for that iteration and D is the divisor. For the first iteration, the previous remainder value $R_{i-1}$ may be initialised to a value equal to the first operand A which is being divided. Equations 1 and 2 are essentially equivalent because after generating the $R_{i-1}-q_i\times D$ term, the multiplication by the radix value N may be performed either before or after the new remainder value is placed in the register. The multiplication may be implemented by left-shifting by $\log_2(N)$ bit positions. If $R_i$ is defined as the value before the shift (i.e. the $R_{i-1}-q_i\times D$ is placed in a register at the end of the previous iteration, and then shifted at the start of the next iteration), then Equation 2 may be used, while if $R_i$ is defined as the value after the shift (the $R_{i-1}-q_i\times D$ term is shifted at the end of an iteration before being placed in a register for use in the following iteration), then Equation 1 may be used. Either way, a shift occurs between the calculation of the $R_{i-1}-q_i\times D$ term for one iteration and the calculation of the $R_{i-1}-q_i\times D$ term for the following iteration.

On the other hand, for the SRT square root algorithm, the $i^{th}$ iteration may determine the remainder value $R_i$ based on the previous remainder value $R_{i-1}$, the quotient value $q_i$ selected for the current iteration, and a partial result value $Q_{i-1}$ which corresponds to a combination of the previously selected quotient values in the preceding iterations. More particularly, the updated remainder value may be calculated according to:

$$R_i=N\times(R_{i-1}-q_i(2Q_{i-1}+q_i/2^i)) \qquad \text{(Equation 3)}$$

or $$R_i=N\times R_{i-1}-q_i(2Q_{i-1}+q_i/2^i) \qquad \text{(Equation 4)}.$$

Again, which of these formulas is used depends on whether the shift implementing the multiplication by the radix N occurs after (Equation 3) or before (Equation 4) the subtraction of the term dependent on the partial result value $Q_i$ from the remainder term in a given iteration. For the square root algorithm, the previous remainder value $R_{i-1}$ may be initialised to a value selected depending on the value B being square rooted. For example, a lookup table or some logic gates may map a selection of bits of value B to the initial value for the remainder. The partial result value $Q_{i-1}$ may be initialised in a similar way based on B. The SRT square root algorithm may then be repeated according to the number of fractional bits to be generated.

In some cases, the added complexity of the SRT square root algorithm compared to the SRT divide algorithm may be caused by the partial result value $Q_{i-1}$ having a different number representation than the divisor D. In the SRT divide and square root algorithms, the quotient values may typically be selected from a set of values which include both negative and positive values. For example, if the radix is 2 then the quotient value may be selected from the set $-1, 0, +1$. This means that the remainder value and the partial result value may be represented in signed-digit format in which the value is represented by a first value representing the positively-weighted digits of the partial result value and a second value representing the negatively-weighted digits of the partial result value. Hence, adding two values represented in signed-digit format would typically require two additions (one for the positive values and one for the negative values). In contrast, the divisor D which is added in the SRT division algorithm may typically be represented as an unsigned value, which would only need a single addition in order to add it to the remainder value. Therefore, the circuitry for performing a single addition to add the divisor D to the previous remainder $R_{i-1}$ according to Equation 1 or 2 above would not normally be able to add the partial result value term to the remainder term according to Equation 3 or 4 while remaining in signed-digit format, because this would require two additions. While it is possible to convert the partial result value $Q_{i-1}$ into a signed or unsigned value so that it can be combined with the updated remainder value R using a single adder, this will require much additional circuitry which increases circuit area. Also, to give sufficient time for this additional circuitry to convert the partial result from the signed-digit format to a two's complement value, the shared adder would in practice have to be provided later within the combined divide-square root circuitry, which would therefore slow down the SRT divide algorithm.

To address this, the shared remainder updating circuitry may comprise circuitry which performs a calculation for determining the updated remainder value $R_i$ using the partial result value $Q_{i-1}$ in the signed-digit format, when performing the SRT square root algorithm. That is, the updated remainder value may be calculated without converting the partial result value from the signed-digit format to signed or unsigned two's complement or another representation. This is counterintuitive since, one would think that leaving the partial result value in the signed-digit format (in contrast to the divisor value D being in 2's complement format) would remove the symmetry between the SRT divide and square root algorithms so that combined divide-square root circuitry cannot be provided.

However, the inventors recognised that this is not the case. For the SRT square root algorithm, first and second adding stages may be used to add first and second values representing positively-weighted and negatively-weighted digits of the partial result value, in order to implement one iteration of the SRT square root algorithm. The order in which the first and second values are added does not matter—the first adding stage can add one and the second adding stage can add the other. For the divide, the first and second adding stages may be reused to perform additions for generating the updated remainder value for two successive iterations of the SRT divide algorithm.

Hence, the same two adding stages may implement a single iteration of the SRT square root algorithm or two iterations of the SRT divide algorithm. This allows improved performance of the SRT divide algorithm and greater area efficiency since it is not necessary to provide circuitry for converting the partial result value $Q_i$ from the signed-digit format.

Hence, the shared remainder updating circuitry may comprise at least one remainder updating stage. Each remainder updating stage may comprise shared circuitry which outputs, in response to the previous remainder value $R_{i-1}$ for one iteration: the updated remainder value $R_{i+1}$ to be generated by the end of the subsequent iteration when performing the SRT divide algorithm; and the updated remainder value $R_i$ to be generated at the end of the one iteration when performing the SRT square root algorithm. Hence, two iterations of the SRT divide algorithm correspond to one iteration of the SRT square root algorithm.

Each remainder updating stage may have first and second adding stages, which are shared between the divide and square root processing. First and second selecting circuitry (e.g. multiplexers) may be provided for selecting which values should be added by the first and second adding stages, depending on the type of operation being performed. For example, the first and second selecting circuitry may select between a value depending on the divisor D for the SRT divide algorithm, and a value depending on the partial result value $Q_{i-1}$ for the SRT square root algorithm.

Each remainder updating stage may also have first shift circuitry for selectively shifting the output of the first adding stage before supplying the results to the second adding stage. When performing the SRT divide algorithm, the first shift circuitry may perform a shift so that the input to the second adding stage will be the previous remainder value $R_i$ for the subsequent iteration for generating $R_{i+1}$. On the other hand, for the SRT square root algorithm the first shift circuitry may not apply a shift and may instead supply the unshifted output of the first adding stage to the second adding stage, since in this case the output of the first adding stage is an intermediate result within the same iteration of the square root algorithm.

Second shift circuitry may be provided to shift either an input of the first adding stage or an output of the second adding stage. The second shift circuitry may apply the shift for both the SRT divide algorithm and the SRT square root algorithm. If the second shift circuitry is implemented at the output of the second adding stage then Equations 1 and 3 shown above apply, while if the second shift is implemented at the input of the first adding stage then the processing may be as in Equations 2 and 4 above.

In this way, a combined divide-square root circuitry may be implemented which allows the SRT divide algorithm to proceed through twice as many iterations per processing cycle as the SRT square root algorithm while allowing increasing sharing of circuitry.

In some examples, the shared result generating circuitry may have several of the remainder updating stages discussed above. Hence, the updated remainder value of one remainder updating stage may be provided as the previous remainder value for the following remainder updating stage to use for an iteration which is two iterations further on for the SRT divide and one iteration further on for the SRT square root. For example, if there are S remainder update stages, then within a single processing cycle the shared result generating circuitry may complete S iterations of the SRT square root algorithm or 2S iterations of the SRT divide algorithm.

Having completed the desired number of iterations, the result value Q can then be generated based on the quotient values selected in the iterations. The result generating circuitry for doing this may be shared between the divide and square root algorithms so that an identical circuit can be used.

The technique discussed above may be used for any radix-N SRT divide and square root algorithms. However, radix-2 SRT algorithms may be simpler to implement in circuitry (in particular, the quotient selection is easier). Nevertheless, the technique can also be applied to higher radix SRT algorithms.

FIG. 1 schematically illustrates a data processing apparatus 2 comprising a processor 4, an instruction decoder 6, memory 8 and registers 10. The instruction decoder 6 decodes instructions fetched from memory 8 to generate control signals for controlling the processor 4 to perform processing operations using data values in the registers 10. The processor 4 includes combined divide/square root circuitry 12 for performing division and square root operations using floating-point operands in the registers 10. In response to a divide instruction, the instruction decoder 6 controls the processor 4 to divide a first operand A by a divisor operand D to generate a result value Q. The operands A and D may be obtained from registers 10 or may be specified by immediate values within the divide instruction. The result value Q may also be placed in a register 10. Similarly, in response to a square root instruction, the instruction decoder 6 controls the combined divide/square root circuitry 12 to perform a square root operation to generate a result Q which is (at least approximately) equal to the square root of a second operand B identified by the square root instruction. If the quotient A/D or the square root value $\sqrt{B}$ is irrational or requires greater precision than is available in the floating-point format used for the result Q, the result will be an approximation of the true quotient or square root. It will be appreciated that the processor 4 and data processing apparatus 2 may have many other elements not shown in FIG. 1 for conciseness.

Figure 2:
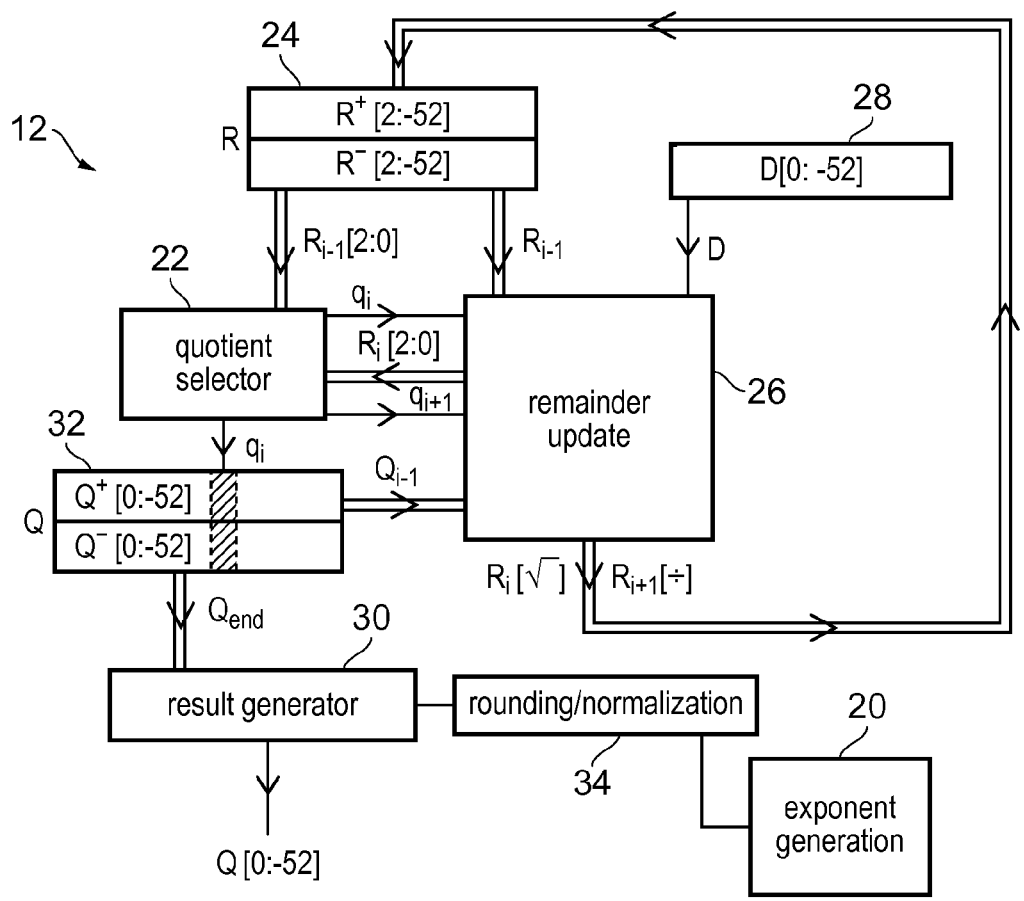
FIG. 2 shows an example of part of the combined divide-square root circuitry.

FIG. 2 shows a portion of the combined divide/square root circuitry 12. The combined divide/square root circuitry 12 includes exponent generation circuitry 20 for generating a result exponent of the result value Q. For example, for a divide operation the exponent of the result may be generated based on the difference between the exponents of the first operand A and the divisor D. For the square root operation, the exponent may be generated by halving the exponent of the second operand B. If the exponent is odd, the radicand is right-shifted by one place and the exponent incremented before being halved. Some adjustments to the exponent may be required depending on normalisation of the result value Q. The exponent generation circuitry 20 may generate the exponent according to any known technique.

Circuitry for generating the significance of the result value Q is shown in more detail in FIG. 2. The combined divide/square root circuitry 12 uses the SRT (Sweeney, Robertson, Tocher) method. The example discussed herein uses a radix-2 SRT division algorithm and radix-2 SRT square root algorithm, but it will be appreciated that other values of the radix could be used. The SRT division and square root algorithms use the same radix value to allow more circuitry to be shared between the two algorithms.

The radix-2 SRT division algorithm derives digits of the result value Q (also referred to as a quotient value) digit-by-digit by performing a number of iterations depending on the number of bits to be generated for Q. In each iteration, the top few bits of the previous remainder value $R_{i-1}$ (as stored in register 24) are examined by quotient selection circuitry 22 in order to select the next quotient value $q_i$. For radix-2 SRT, the quotient selection circuitry 22 may consider the top three bits of the remainder to determine the value of the remainder, and then select the quotient value $q_i$ according to the following rules:

if $-4 \le R_{i-1} \le -1$, then $q_i = -1$ if $R_{i-1} = 0: q_i = 0$ $+1 \le R_{i-1} \le +4$, then $q_i = +1$ However, other quotient selection schemes are also possible.

For SRT division, remainder updating circuitry 26 then updates the partial remainder value according to one of Equations 1 and 2 discussed above. This algorithm is similar to long division, except that the remainder update is performed using signed-digit arithmetic and the quotient is returned in signed-digit format, with each quotient $q_i$ being selected from the values −1, 0, +1 for radix-2 SRT. Having updated the remainder, the new value of the remainder $R_i$ is then returned and becomes the previous remainder value $R_{i-1}$ for the following iteration. A register 32 stores a partial result value Q (also referred to as a partial quotient value) which represents the part of the result value which has been calculated so far in the SRT process. In each iteration i, the next quotient value $q_i$ is inserted one place to the right of the least significant bit of the partial result value $Q_{i-1}$ from the previous iteration, and eventually once the desired number of iterations is complete, the register 32 will store the result value $Q_{end}$ comprising the required number of digits.

The partial result value Q is stored in register 32 in signed-digit format which means that it comprises a first value $Q^+$ representing the positively-weighted bits of Q (the bits for which the quotient value $q_i$ was selected as +1) and a second value $Q^-$ representing the negatively-weighted bits (the bits for which the quotient value $q_i$ was selected as −1). Similarly, the remainder value R is also stored in signed-digit format in register 24 with a first value $R^+$ representing positively-weighted bits and a second value $R^-$ representing negatively-weighted bits. In contrast, IEEE floating-point uses sign-magnitude format; so the final result for the quotient Q is an unsigned value, and the sign of the quotient is given by sign (A) XOR sign (D). It will be appreciated that other embodiments may store the remainder value R in register 24 in carry-save 2's complement form instead of in signed-digit format.

Therefore, when the required number of iterations are complete, the partial result value $Q_{end}$ in register 32 is still in signed-digit format, and so result generator 30 is provided to convert it into the magnitude of the result value Q, which can be used as the significance of a floating-point value representing the final result. The result generator 30 comprises a carry-propagate adder for performing a twos complement subtraction of the negatively-weighted bits a from the positively-weighted bits $Q^+$ (e.g. $Q = \Sigma_{i=0 \ldots -52} q_i \times 2^i$ or $Q = Q^+ + \sim Q^- + 1$). Rounding and normalisation circuitry 34 provides rounding and/or normalisation depending on the currently selected rounding mode and whether or not the result is subnormal.

For SRT division, the remainder value used for the first iteration is initialized to a value equal to the operand A being divided. Hence, a worked example of the SRT division (corresponding to $1.01101 \div 1.11011 = (45/32)/(59/32) = 0.11000011\ldots$) is presented below using the starting values $R_{-1} = A = 1.01101$, $D = 1.11011$, and $Q_{-1} = 0$. (1 denotes +1 and $\underline{1}$ denotes −1.)

| Iteration | $R_{i-1}$ | $q_i$ | $R_i = 2(R_{i-1} - q_i \cdot D)$ | $Q_i$ |
|---|---|---|---|---|
| 0 | 1.01101 | 1 | 2(1.01101 − 1.11011) | 1 |
| 1 | −0.11100 | 0 | 2(−0.11100) | 1.0 |
| 2 | −1.11000 | −1 | 2(−1.11000 + 1.11011) | 1.0$\underline{1}$ |
| 3 | 0.00110 | 0 | 2(0.00110) | 1.0$\underline{1}$0 |
| 4 | 0.01100 | 0 | 2(0.01100) | 1.0$\underline{1}$00 |
| 5 | 0.11000 | 0 | 2(0.11000) | 1.0$\underline{1}$000[15] |
| 6 | 1.10000 | 1 | 2(1.10000 − 1.11011) = −0.10110 | 1.0$\underline{1}$0001 |

Hence, $Q_6$, the quotient to 6 bits' accuracy=1.0$\underline{1}$0001=0.11001, and the remainder, given by $R_6$, is $(-0.1011/1.11011) \times 2^{-6}$. (The IEEE floating-point standard allows negative remainders.) To find the binary equivalent of $Q_6$, the negatively-weighted bits 0.010000 are subtracted from the positively-weighted bits 1.000001 to give the binary result 0.110001.

In contrast, for the radix-2 SRT square root algorithm, the remainder updating circuitry 26 updates the remainder in each iteration according to the Equation 3 or Equation 4 discussed above, which updates the remainder value based on the partial result value $Q_{i-1}$ (the combination of the previously selected quotient values) and the quotient value $q_i$ for the current iteration. The remainder update circuitry 26 may be provided with the previous partial result value $Q_{i-1}$ and the new quotient value $q_i$ and generate the term $-q_i(2Q_{i-1}+q_i/2^i)$ to be added or subtracted from the previous remainder value $R_{i-1}$ (e.g. by appending the new quotient value $q_i$ one place to the right of the least significant bit of the previous partial result value $Q_{i-1}$, and then adding or subtracting as appropriate, or by another method which generates an equivalent result—e.g. see FIG. 4 which effectively generates the $$-q_i\left(2Q_{i-1}+\frac{q_i}{2^i}\right)$$

term in two stages). Also, for the square root algorithm the remainder value is initialised to a value selected based on the operand B being square rooted (as shown in the Appendix below, this initialisation may effectively allow a number of iterations of the process to be skipped). Otherwise, the SRT algorithm is similar to the divide. Worked examples of performing the SRT algorithm are provided in the Appendix below.

Figure 3:
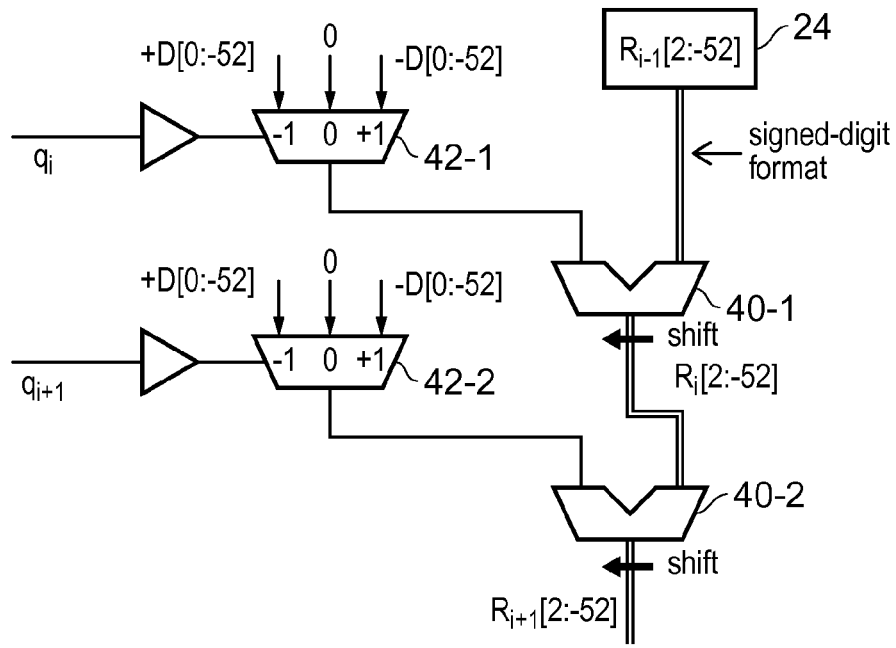
FIG. 3 illustrates an example of obtaining an updated remainder value when performing an SRT division algorithm.

FIG. 3 shows part of the remainder updating circuitry 26 for implementing two iterations of the SRT divide operation. The remainder updating circuitry 26 has two 3:2 carry-save adders 40-1, 40-2, two multiplexers 42-1, 42-2 and shift circuitry not shown in the drawing for conciseness. The double lines in FIG. 3 represent values in signed-digit form, whereas the single lines from multiplexers 42 represent values in two's complement form. In a first iteration of the SRT divide algorithm, the first carry-save adder 40-1 adds the previous remainder value $R_{i-1}$ in signed-digit format to a value selected by multiplexer 42-1 depending on the quotient value $q_i$ selected for the first iteration. If the quotient value is $-1$ then the multiplexer selects the divisor value $+D$ from register 28. If the quotient value is zero then the multiplexer 42 selects a value of 0. If the quotient value is $+1$ then the multiplexer 42 selects the two's complement of the divisor, $-D$. Hence, the output of the multiplexer 42-1 is the $-q_i \times D$ term in Equations 1 and 2 above. The first carry-save adder 40-1 then adds the value output by the multiplexer 42-1 to the positive remainder value $R_{i-1}^+$ and negative remainder value $R_i^-$ from register 24, to generate carry and save values, which correspond to the positively- and negatively-weighted values of the updated remainder value $R_i$ in signed-digit form ($R_i^+$ and $R_i^-$), which are then left shifted by one bit position, to generate the updated remainder value $R_i$. Similarly, the second adder 40-2 and second multiplexer 42-2 perform similar operations for the following iteration to generate the updated remainder value $R_{i+1}$ from the previous remainder value $R_i$, the divisor D and the quotient value $q_{i+1}$ selected for that iteration, with a shift again being applied to the output of the second adder 40-2. Hence, the circuitry shown in FIG. 3 corresponds to two full iterations of the SRT divide algorithm.

Figure 4:
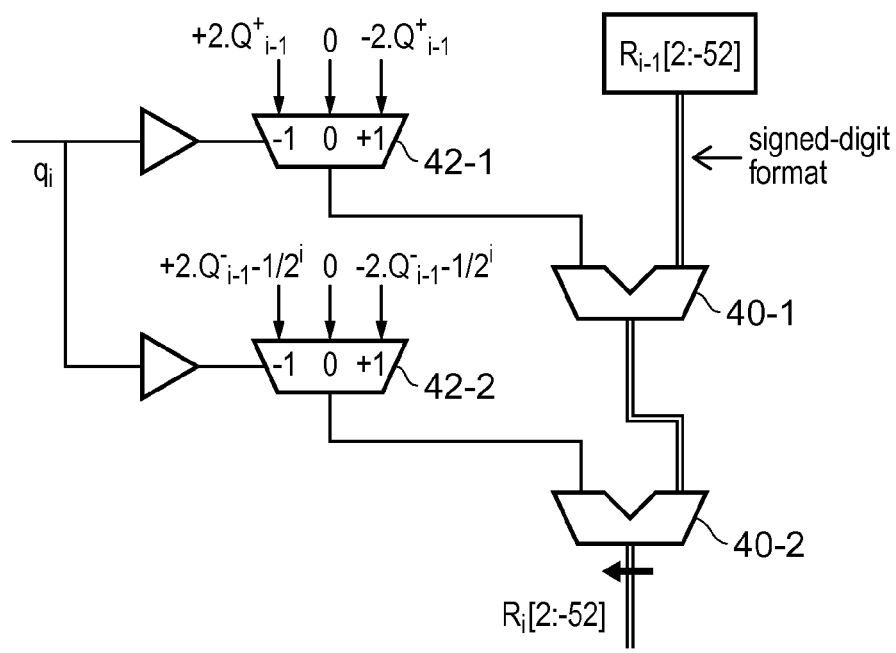
FIG. 4 shows an example of obtaining an updated remainder value when performing an SRT square root algorithm.

FIG. 4 shows how the same adders 40-1, 40-2 and multiplexers 42-1, 42-2 can be reused for performing a single iteration of the SRT square root operation. $Q_{i-1}^+$ and $Q_{i-1}^-$ representing the positively- and negatively-weighted bits of the partial result value $Q_{i-1}$ respectively. The partial result value can be added to the remainder value $R_i$ while remaining in signed-digit format, by using the two rows of adders 40-1, 40-2 to add the positively-weighted and negatively-weighted values respectively, so that it is not necessary to convert the partial result value to two's complement. Hence, in this example the first multiplexer 42-1 selects between two times the positively-weighted value $+2Q_{i-1}^+$, its two's complement $-2Q_{i-1}^+$ and zero depending on the selected quotient value $q_i$ (selecting $+2(Q_{i-1}^+$, if $q_i=-1$; 0 if $q_i=0$; and $-2Q_{i-1}^+$ if $q_i=+1$). The values $+2Q_{i-1}^+$ and $-2Q_{i-1}^+$ can be generated for example by left shifting $Q_{i-1}^+$ by one place. The 3:2 carry-save adder 40-1 in the first adding stage adds the remainder value $R_{i-1}^+$, $R_{i-1}^-$ in signed-digit format to the value selected by the first multiplexer 42-1, to output an intermediate value in signed-digit format. In a similar way, the second multiplexer 42-2 selects $$+2Q_{i-1}^- + \frac{1}{2^i}$$

if $q_i=-1$, selects zero if $q_i=0$ and selects $$-2Q_{i-1}^- + \frac{1}{2^i}$$

if $q_i=+1$, and the value selected by multiplexer 42-2 is added by the second adder 40-2 to the values generated by first adder 40-1, to generate positively- and negatively-weighted values which are then left shifted by one place to generate the updated remainder value $R_i$. Worked examples of this process are shown in the Appendix below. Note that when performing an SRT square root as in FIG. 4, there is no left shift after the first adding stage 40-1 as there was in FIG. 3. This is because the two adding stages 40-1, 40-2 are now performing different parts of the same iteration so a shift is only required after the second stage 40-2. Note also that the selection by multiplexer 42-2 is made in response to the quotient value $q_i$ for iteration i in FIG. 4, as opposed to the quotient value for the following iteration i+1 when performing the divide operation as shown in FIG. 3.

In an alternative embodiment, the values selected by the multiplexers 42-1, 42-2 could be swapped. For example, the same result could be achieved by having the first multiplexer 42-1 select between $+2Q_i^+$, zero and $$-2Q_{i-1}^- + \frac{1}{2^i}$$

and the second multiplexer 42-2 selecting between $-2Q_i^+$, zero and $$+2Q_{i-1}^- + \frac{1}{2^i},$$

or by swapping the order of the first and second stages. Also, the $-\frac{1}{2^i}$ term could be subtracted from the positively-weighted values $+2Q_{i-1}^+$ and $2Q_{i-1}^+$ instead of the negatively-weighted values $+2Q_{i-1}^-$ and $Q_{i-1}^-$. The net result is that the value added to the remainder across the two adding stages 40-1, 40-2 is:

$$+2Q_{i-1}^- + 2Q_{i-1}^- - \frac{1}{2^i} \text{ if } q_i = -1$$

0 if $q_i=0$, and $$-2Q_{i-1}^+ - 2Q_{i-1}^- - \frac{1}{2^i} \text{ if } q_i = +1,$$

which in each case equals the $-q_i(2Q_{i-1}+q_i/2^i)$ term from equations 3 or 4 above.

Figure 5:
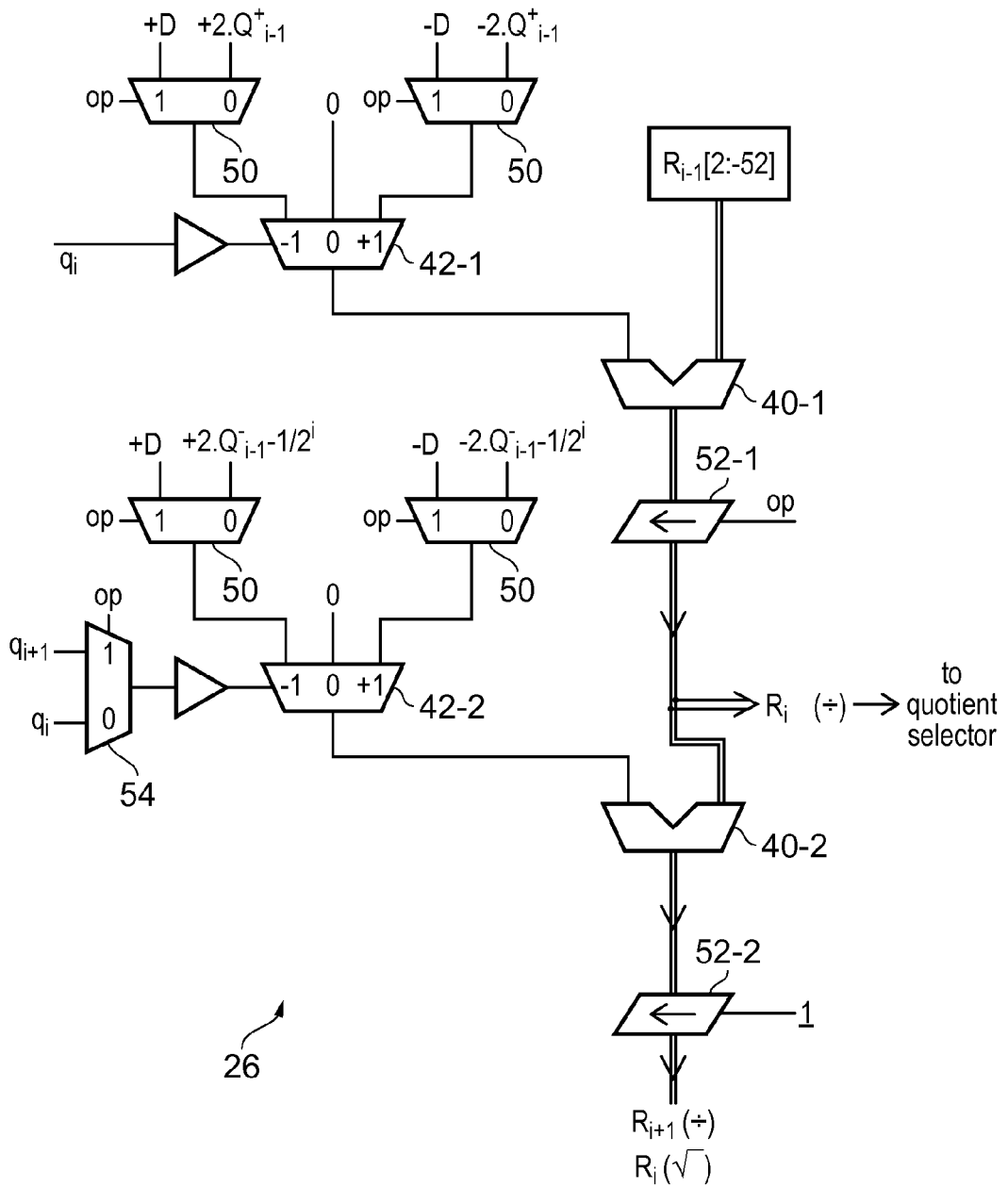
FIG. 5 shows combined circuitry for obtaining the updated remainder value for both the SRT division and SRT square root algorithms.

As shown in FIG. 5, the circuits shown in FIGS. 3 and 4 can be combined into a single remainder updating circuit 26 by providing additional multiplexers 50 for selecting the inputs to the multiplexers 42-1, 42-2 depending on whether a divide or square root operation is being performed. For example, a parameter op may be input to represent the type of operation being performed (in this example op=1 for divide and op=0 for square root, although other representations could also be used). The multiplexers 50 select between values dependent on the divisor D and values dependent on the partial result value $Q_{i-1}$ based on the op parameter. Also, a first shifter 52-1 is provided between the first and second adding stages 40-1, 40-2. The first shifter 52-1 selects whether to apply a left shift, based on the op parameter. The shift is only applied for the divide. If the op parameter=1 for the divide and =0 for the square root, the op parameter directly specifies the shift amount to be applied, but other embodiments may map the op parameter to the shift amount in other ways. For the second stage, a multiplexer 54 is provided to select between the quotient values $q_i$ and $q_{i+1}$ depending on the type of operation being performed. In this way, the circuitry 26 showing in FIG. 5 can generate, in response to the previous remainder value $R_i$ for one iteration, either an updated remainder value $R_i$ for the same iteration in the case of the square root operation or the updated remainder value $R_{i+1}$ for the next iteration in the case of the divide. As shown in FIG. 5, when performing the divide operation, some bits of the updated remainder value $R_i$ for the first iteration may be output to the quotient selector 22 for use when selecting the quotient value $q_{i+1}$ for the following iteration. The second shifter 52-2 provides at the output of the second adder 40-2 could in other embodiments be moved before the first adder 40-1 to left shift the previous remainder value $R_i$ input to the first adder 40-1 by one place. The second shifter 52-2 applies a shift for both the divide and square root operations.

Figure 6:
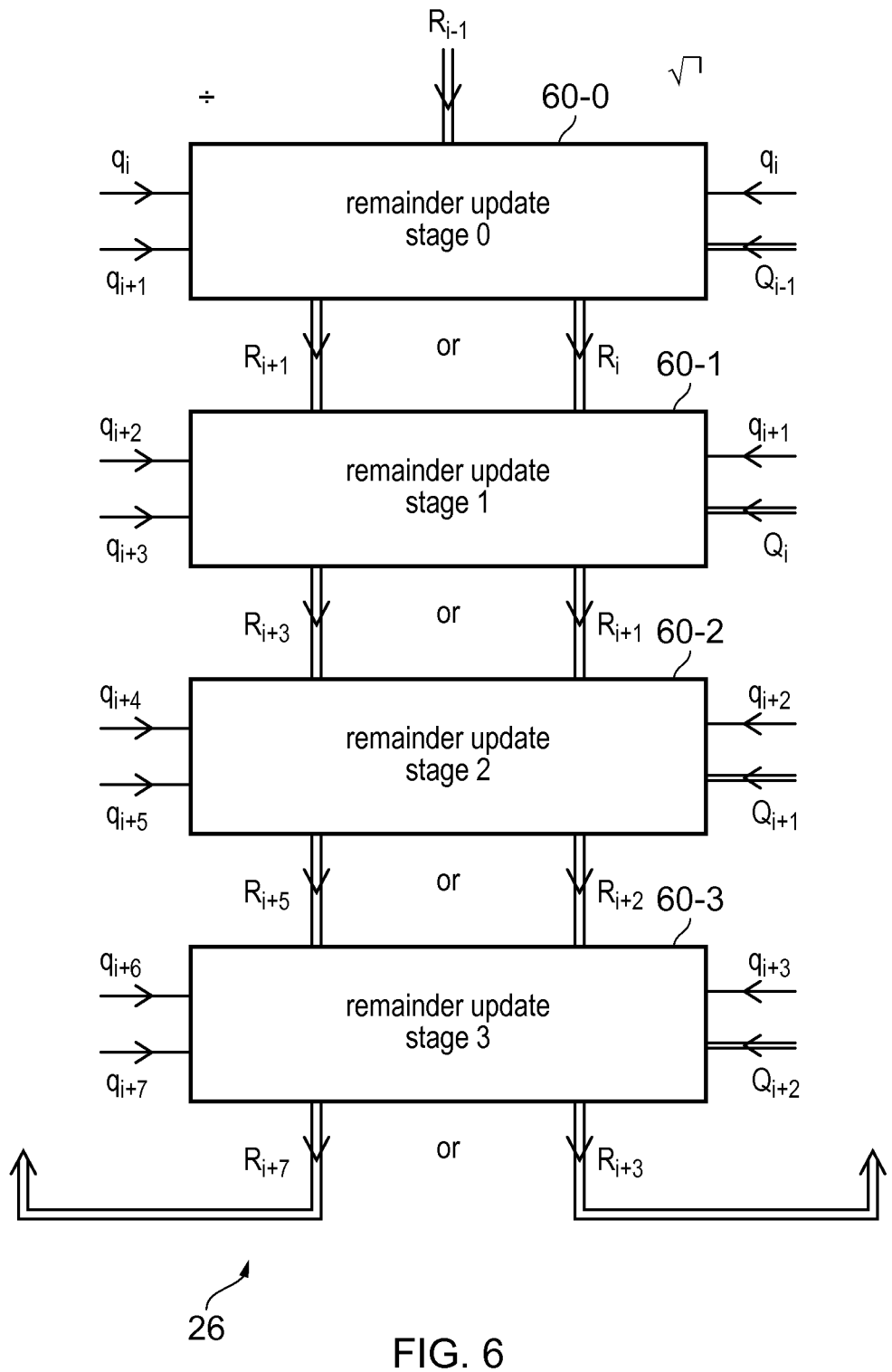
FIG. 6 shows an example of circuitry having several remainder updating stages, each remainder updating stage for performing two iterations of the SRT division algorithm or one iteration of the SRT square root algorithm.

The circuitry shown in FIG. 5 may be considered to be a remainder updating stage for generating an updated remainder which is two iterations further on in the case of SRT divide and one iteration further on for SRT square root. As shown in FIG. 6, the remainder updating circuitry 26 may in some cases include several such remainder updating stages 60, each of which has circuitry as shown in FIG. 5. Within a single processing cycle, there may be time for several such remainder updating stages to complete their processing, so that within one processing cycle the processing circuitry 4 can perform twice as many iterations of the divide operation than for the square root operation. In this example there are four remainder updating stages, so within one processing cycle the remainder updating circuitry 26 receives the previous remainder value $R_{i-1}$ at the start of iteration i, and by the end of the cycle has completed either 8 iterations of the divide operation to generate the updated remainder value $R_{i+7}$, or 4 iterations of the square root operation to generate the updated remainder value $R_{i+3}$. The intermediate results generated by one of the earlier stages may be used as the result value if the desired number of iterations are complete partway through a cycle.

Figure 7:
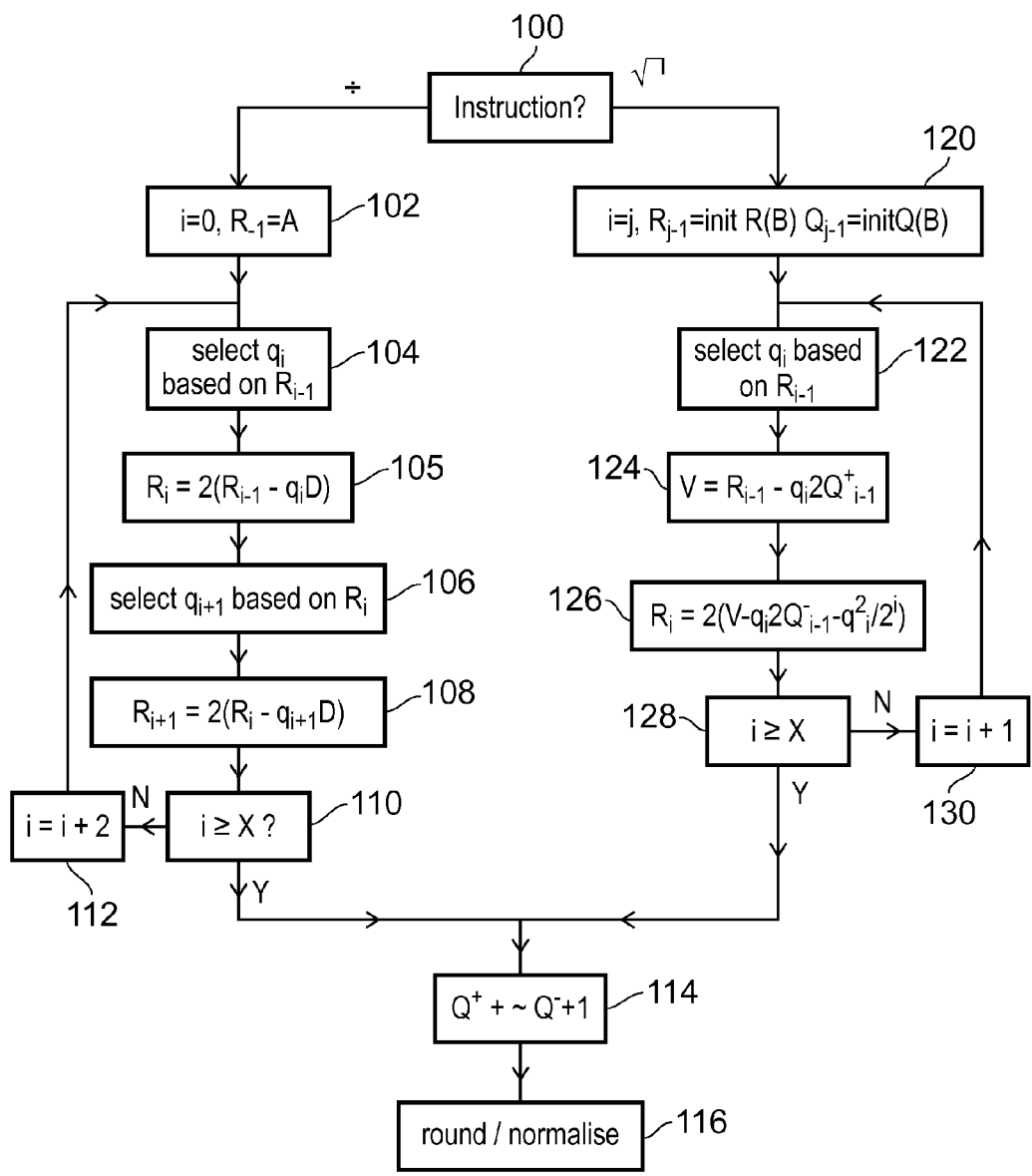
FIG. 7 is a flow diagram showing a method of performing an SRT divide algorithm or an SRT square root algorithm.

FIG. 7 shows a method of performing an SRT square root operation or SRT divide operation. At step 100 the instruction decoder 6 determines what type of instruction is being executed. If the instruction is a divide instruction then at step 102 the previous remainder value $R_{-1}$ for the first iteration is initialised to the value of the operand A being divided (more particularly, the positively-weighted value $R_{-1}^+$ is equal to the significance of operand A and the negatively-weighted value $R_{-1}^-$ is zero). For division, the partial result value $Q_{-1}$ is initialized to 0 and the iterations start with i=0. At step 104, a new iteration begins. The quotient selector 22 selects the quotient value $q_i$ based on the previous remainder value $R_{i-1}$ for the current iteration, and the quotient value $q_i$ is inserted into register 32 to update the partial result value $Q_{i-1}$ to a new value $Q_i$. At step 105 the remainder updating circuitry 26 generates the updated remainder value $R_i$ for the current iteration, which becomes the previous remainder value for the following iteration. The following iteration begins at step 106 where quotient value $q_{i+1}$ is selected based on $R_i$ and used to update the partial result value $Q_i$ to a new value $Q_{i+1}$ and at step 108 the remainder updating circuitry 26 generates the remainder value $R_{i+1}$ for the following iteration based on quotient value $q_i$ and divisor D. At step 110 it is determined whether the required number of iterations X have been completed. If not, then i=i+2 at step 112 and the method returns to step 104 to start an iteration two iterations further on than the previous time step 104 was carried out. The method then proceeds through steps 104 to 112 until eventually all the required iterations are complete. In some examples as shown in FIG. 5 each processing cycle may correspond to two of the iterations, i.e. one loop through steps 104 to 112. Alternatively, as shown in FIG. 6 a single processing cycle may correspond to several loops through steps 104 to 112 depending on the number of remainder update stages 60 provided. Having completed the required number of iterations, at step 114 the result generator 30 performs a 2's complement subtraction of the positive and negative partial result values $Q^+$, $Q^-$ and at step 116 the rounding and normalisation circuitry 34 rounds or normalises the results to generate the final result value Q. Meanwhile, the exponent of the result value is generated using any known technique.

On the other hand, if at step 100 the instruction was a square root instruction then at step 120 the remainder value $R_{j-1}$ and partial result value $Q_{j-1}$ are initialised to values selected based on the radicand operand B. In practice, to obtain a head start in performing the square root operation, the initialisation of the remainder R and partial result value Q may factor in more than one initial iteration of the SRT process (e.g. 3 or 4 iterations), so that the remainder $R_{j-1}$ and the partial result value $Q_{j-1}$ are in general set to values selected based on the radicand operand B, depending on how many iterations j are skipped. If more than one iteration is skipped, then different initial values for R and Q may be defined for different ranges of operand B, and the appropriate values may be selected using a lookup table or some logic circuitry. In general, the greater the number of steps that are skipped the greater the complexity of the logic for determining the values to which the remainder R and partial result value Q are initialised, so there is a trade-off between faster performance and reducing circuit area, depending on which the circuit designer can select a given value of j as appropriate. See the Appendix for an example where the initial values are looked up for the start of the fourth iteration, so that the first three iterations can be skipped.

Having initialised the remainder R and partial result value Q for a given iteration j then the $j^{th}$ iteration begins. At step 122 the quotient selector 22 selects the next quotient value $q_i$ and updates $Q_{i-1}$ to a new value $Q_i$ in the same way as in step 104. At step 124 the first adding stage 40-1 determines an intermediate value V by adding the previous remainder value $R_{i-1}$ and a term based on one of the positively- and negatively-weighted values of the partial result value $Q_{i-1}^+$ and $Q_{i-1}^-$, and then at step 126 the second adding stage 40-2 adds the result of step 124 to a value dependent on the other of the positively- and negatively-weighted values, followed by a left shift by the second shifter 52-2. In this example, step 124 adds $-q_i \cdot 2Q_{i-1}^+$ to $R_{i-1}$ to generate an intermediate value V, and step 126 adds $-q_i \cdot 2Q_{i-1}^- - q_i^2/2^i$ to the intermediate value V and then multiplies by the radix 2 to generate the new remainder value $R_i$. Hence, steps 124 and 126 together are equivalent to Equation 3 above (it will be appreciated that other examples could use Equation 4 or could use a different series of additions to generate the same result). At step 128 it is determined whether the desired number of iterations X have been completed, and if not then at step 130 the method moves to the next iteration (i=i+1) and returns to step 122. Again, depending on the number of remainder update stages 60 provided, the method may loop through steps 122 to 130 one or more times for each processing cycle. Having completed the desired number of iterations then the method proceeds to step 114 and 116 in the same way as for the divide operation. Exactly the same quotient selector circuit 22 and result generator 30 and rounding a normalising circuitry 34 can be provided for both divide and square root.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the dependent claims could be made with the features of the independent claims without departing from the scope of the claims.

APPENDIX—WORKED EXAMPLES OF SRT SQUARE ROOT CALCULATION

An SRT square root calculation starts by deriving the most significant bits of the root by inspecting the top few bits of the radicand. The following Table gives the four possible combinations of twice the three most significant root bits, 2·Root[0:−2], the corresponding minimum values of Root^2 for each 3-bit combination, and the range of radicand values that could give rise to each value of Root[0:−2].

Possible Look-Up Table for Root Estimate in Control Path

| 2.Root[0:−2] | Root^2 | Radicand Range[0:−5] | $q_1$ | $q_2$ | $q_3$ |
|---|---|---|---|---|---|
| 1.00 . . . | 0.010000 . . . | 0.010000 . . . 0.011000 | 1 | 0 | 0 |
| 1.01 . . . | 0.011001 . . . | 0.011001 . . . 0.100011 | 1 | 0 | 1 |
| 1.10 . . . | 0.100100 . . . | 0.100100 . . . 0.110000 | 1 | 1 | 0 |
| 1.11 . . . | 0.110001 . . . | 0.110001 . . . 0.111111 | 1 | 1 | 1 |

Working through the four rows of the Table, we can derive expressions for the value of $R_3$, the partial remainder after three iterations, using the expression $R_i = 2 \cdot R_{i-1} - q_i \cdot (2Q_{i-1} + q_i/2^i)$, as follows:

Radicand=$R_0$=0.010000 . . . 0.011000;Root[0:−2]= 0.100 . . . $q_1=1 \rightarrow R_1=2R_0-0.1$; $q_2=0 \rightarrow R_2=2R_1-0.0$; $q_3=0 \rightarrow R_3=2R_2-0.0$; ∴$R_3=2(2(2R_0-0.1)-0.0)-0.0=8 \times R_0-10.0=8 \times (R_0-0.01)$ Radicand=$R_0$=0.011001 . . . 0.100011;Root[0:−2]= 0.101 . . . $q_1=1 \rightarrow R_1=2R_0-0.1$; $q_2=0 \rightarrow R_2=2R_1-0.0$; $q_3=1 \rightarrow R_3=2R_2-1.0-0.001$ ∴$R_3=2(2(2R_0-0.1)-0.0)-1.001=2(4R_0-1.0)-0.0)-1.001=8R_0-10.0-1.001=8(R_0-0.011001)$ Radicand=$R_0$=0.100100 . . . 0.110000;Root[0:−2]= 0.110 . . . $q_1=1 \rightarrow R_1=2R_0-0.1$; $q_2=1 \rightarrow R_2=2R_1-1.0-0.01$; $q_3=0 \rightarrow R_3=2R_2-0.0$ ∴$R_3=2(2(2R_0-0.1)-1.01)-0.0=2(4R_0-1.0)-1.01)=8R_0-10.0-10.1=8(R_0-0.100100)$ Radicand=$R_0$=0.110001 . . . 0.111111;Root[0:−2]= 0.111 . . . $q_1=1 \rightarrow R_1=2R_0-0.1$; $q_2=1 \rightarrow R_2=2R_1-1.0-0.01$; $q_3=1 \rightarrow R_3=2R_2-1.1-0.001$ ∴$R_3=2(2(2R_0-0.1)-1.01)-1.101=2(4R_0-1.0-1.01)-1.101=2(4R_0-10.01)-1.101=8R_0-100.1-1.101=8R_0-110.001=8(R_0-0.110001)$ Thus, the SRT iterations can be initialized by feeding 8·$R_0$ onto the Ri+ input and 8·k, where k is the constant calculated above as a function of radicand range, onto the Ri− input.

Example 1 (0.75≤Radicand, $R_0$<1.0)

$R_0$ = 0.110101 = 53/64; Q = 0.111010001111 . . .
Initialization: $Q_0$ = 0

| Iteration | $R_i = 2 \cdot R_{i-1}$ | $q_i$ | $q \cdot Q_{i-1}$ | $R_i = 2 \cdot R_{i-1} - Q_i^* = 2 \cdot R_{i-1} - q_i \cdot (2Q_{i-1} + q_i/2^i)$ |
|---|---|---|---|---|
| 1 | 1.10101 | 1 | 0 | 1.10101 − (0 + 0.1) = 1.00101 |
| 2 | 10.0101 | 1 | 1 | 10.0101 − (1.0 + 0.01) = 1.0001 |
| 3 | 10.001 | 1 | 1.1 | 10.001 − (1.1 + 0.001) = 1.1̲00 |
| 4 | 1.0 | 1 | 1.11 | 1.0 − (1.11 + 0.0001) = 0.1̲101 |
| 5 | 1.1̲01 | 1̲ | 1.111 | 1.1̲01 + (1.111 − 0.00001) = 0.01001̲ |
| 6 | 0.1001̲ | 0 | 1.1101 | 0.1001̲ |
| 7 | 1.001̲ | 1 | 1.11010 | 1.001̲ − (1.1101 + 0.0000001) = 0.1̲111001̲ |
| 8 | 1.111001̲ | 1̲ | 1.110101 | 1.111001̲ + (1.110101 − 0.00000001) = 0.001̲10001̲ |

2Q = 1.1111̲011̲(001̲ = 1.1101000111 . . .
Using look-up initialization as described above, $2Q_3$ = 1.11, $R_4$ = $2R_3$ =16 × (0.110101 − 0.110001) = 16 × 0.000100 = 1.00 − this all matches up correctly.

Example 2 (0.5≤Radicand, $R_0$<0.75)

| | $R_0 = 0.100111 = 39/64$; $Q = 0.110001111101\ldots$ | | | |
|---|---|---|---|---|
| | Initialization: $Q_0 = 0$ | | | |
| Iteration | $R_i = 2 \cdot R_{i-1}$ | $q_i$ | $q \cdot Q_{i-1}$ | $R_i = 2 \cdot R_{i-1} - Q_i^* = 2 \cdot R_{i-1} - q_i \cdot (2Q_{i-1} + q_i/2^i)$ |
| 1 | 1.00111 | 1 | 0 | 1.00111 − (0 + 0.1) = 0.10111 |
| 2 | 1.0111 | 1 | 1 | 1.0111 − (1.0 + 0.01) = 0.0011 |
| 3 | 0.011 | 0 | 1.1 | 0.011 |
| 4 | 0.11 | 0 | 1.10 | 0.11 |
| 5 | 1.1 | 1 | 1.100 | 1.1 − (1.100 + 0.00001) = 0.0000$\underline{1}$ |
| 6 | 0.000$\underline{1}$ | 0 | 1.1001 | 0.000$\underline{1}$ |
| 7 | 0.00$\underline{1}$ | 0 | 1.10010 | 0.00$\underline{1}$ |
| 8 | 0.0$\underline{1}$ | 0 | 1.100100 | 0.0$\underline{1}$ |

$2Q = 1.100100(00\underline{1}\ldots = 1.100011111\ldots$
Using look-up initialization: $2Q_3 = 1.10$, $R_4 = 2R_3 = 16 \times (0.100111 − 0.100100) = 16 \times 0.000011 = 0.11$.

Example 3 (0.25≤Radicand, $R_0$<0.5)

| | $R_0 = 0.010111 = 23/64$; $Q = 0.100110010111\ldots$ | | | |
|---|---|---|---|---|
| | Initialization: $Q_0 = 0$ | | | |
| Iteration | $2 \cdot R_{i-1}$ | $q_i$ | $q \cdot Q_{i-1}$ | $R_i = 2 \cdot R_{i-1} - Q_i^* = 2 \cdot R_{i-1} - q_i \cdot (2Q_{i-1} + q_i/2^i)$ |
| 1 | 1.10111 | 1 | 0 | 1.$\underline{1}$0111 − (0 + 0.1) = 0.00111 |
| 2 | 0.0111 | 0 | 1 | 0.0111 |
| 3 | 0.111 | 0 | 1.0 | 0.111 |
| 4 | 1.11 | 1 | 1.00 | 1.11 − (1 + 0.0001) = 0.1101 |
| 5 | 1.10$\underline{1}$ | 1 | 1.001 | 1.10$\underline{1}$ − (1.001 + 0.00001) = 0.1$\underline{1}$001 |
| 6 | 1.$\underline{1}$001 | 1 | 1.0011 | 1.$\underline{1}$001 − (1.0011 + 0.000001) = 0.$\underline{1}$10001 |
| 7 | 1.$\underline{1}$0001 | $\underline{1}$ | 1.00111 | 1.$\underline{1}$0001 + (1.00111 − 0.0000001) = 0.0$\underline{1}$0100$\underline{1}$ |
| 8 | 0.$\underline{1}$0100$\underline{1}$ | 0 | 1.001101 | 0.$\underline{1}$0100$\underline{1}$ |
| 9 | $\underline{1}$.0$\underline{1}$00$\underline{1}$0 | $\underline{1}$ | 1.0011010 | $\underline{1}$.0$\underline{1}$00$\underline{1}$ + (1.001$\underline{1}$0$\underline{1}$ − 0.000000001) = 0.000$\underline{1}$0$\underline{1}$00$\underline{1}$ |

$2Q = 1.00111\underline{1}01(000\underline{1}\ldots = 1.00110010(11\ldots$
Using look-up initialization: $2Q_3 = 1.00$, $R_4 = 2R_3 = 16 \times (0.010111 − 0.010000) = 16 \times 0.000111 = 1.11$.

We propose to use pairs of 3:2 adders in the divide datapath as 4:2 adders for square root; instead of adding or subtracting D at each 3:2, need to add or subtract $2 \cdot Q_i+$ and $2 \cdot Q_i-$ on a pair of 3:2's. Also, need to add in the $-q_i/2^i$ bits when $q_i \ne 0$. Here is a fully detailed worked example using the same radicand as Example 3 above.

Worked Example (0.25≤Radicand, $R_0$<0.5)

$R_0 = 0.0101|11 = 23/64$; $Q = 0.1001|1001|0111|0111\ldots$

Initialisation Using Look-Up:

$2Q^+_3 = 1.00, 2R^+_3 = 1.11$ $R_i = 2 \cdot R_{i-1} - q_i(2Q_{i-1} + q_i/2^i)$

| Iteration | $2 \cdot R^+_{i-1}$ | $2 \cdot R^-_{i-1}$ | $q_i$ | $2 \cdot Q^+_{i-1}$ | $2 \cdot Q^-_{i-1}$ | i (1-hot) | $2^{-i}$ |
|---|---|---|---|---|---|---|---|
| 4 | 1.1100|0000 | 0.0000|0000 | 1 | 1.00$\underline{00}$|0000 | 0.0000|0000 | 0.00$\underline{1}$0|0000 | 0.0001|0000 |

From the earlier worked example, expect $R_4 = 0.110\underline{1}$ $q_i = 1 \rightarrow R_i = 2 \cdot R_{i-1} - 1 \cdot (2Q_{i-1} + \frac{1}{2}{}^i) = [1.11 - 0.00] - [1.00 - 0.00] - 0.0001$ (3:2) adds of $2 \cdot R^+_{i-1} + 2 \cdot R^-_{i-1} - 2 \cdot Q^+_{i-1} - 2 \cdot Q^-_{i-1} - 2^{-i}$

| | | |
|---|---|---|
| $2R_3^+$ | 1.1100\|0000 | |
| $2R_3^-$ | 0.0000\|0000 | |
| $-2.Q_3^+$ | 10.1111\|1111 | <-+1 to complete 2's complement of $Q_3^+$ |
| | 1 | (feeds straight onto $lsb$ of $Ca_4^+$ |
| = | | |
| $Ca_4^+$ | 11.1111\|1111 | <-1 indicates change to 0 due to +1+-1 = 0 |
| $Sa_4^-$ | 11.0011\|1111 | |
| $-2.Q_3^-$ | 11.1110\|1111 | <-add in $2^{-1}$ here by *note* inverting $Q_3^-$ bit |
| | 1 | |
| = | | |
| $Cb_4^+$ | 11.1101\|1111 | |
| $Sb_4^-$ | 11.0010\|1111 | |

Compress $msb$'s:

| | |
|---|---|
| $R_4^+$ | 0.1101\|1111 |
| $R_4^-$ | 0.0010\|1111 |

$R_4 = 0.1101|1111 - 0.0010|1111 = 0.1011 (=0.1101)$-correct!

Note: in practice, the digits to the left of the binary point are taken care of by $q_i$ "select & compress" logic and the four msb's of $Q_i^-$ are guaranteed to be '0' from the initialization by look-up.

| Iteration | $2.R^+_{i-1}$ | $2.R^-_{i-1}$ | $q_i$ | $2.Q^+_{i-1}$ | $2.Q^-_{i-1}$ | i (1-hot) | $2^{-i}$ |
|---|---|---|---|---|---|---|---|
| 5 | 1.1011\|1110 | 0.0101\|1110 | 1 | 1.0010\|0000 | 0.0000\|0000 | 0.0001\|0000 | 0.0000\|1000 |

From the earlier worked example, expect, $R_5=0.11001$ $q_i=1 \rightarrow R_i=2 \cdot R_{i-1} \cdot 1 \cdot (2Q_{i-1}+\frac{1}{2}^i)=[10.0-0.101]-[1.001-0.00]-0.00001$ (3:2) adds of $2 \cdot R^+_{i-1}+2 \cdot R^-_{i-1}-2 \cdot Q^+_{i-1}-2 \cdot Q^-_{i-1}-2^{-i}$

| | |
|---|---|
| $2R_4^+$ | 01.1011\|1110 |
| $2R_4^-$ | 0.0101\|1110 |
| $-2.Q_4^+$ | 10.1101\|1111 |
| | 1 |
| $Ca_5^+$ | 11.0111\|1111 |
| $Sa_5^-$ | 11.0011\|1111 |
| $-2.Q_4^-$ | 11.1111\|0111 |
| | 1 |
| = | |
| $Cb_5^+$ | 11.1110\|1111 |
| $Sb_5^-$ | 11.1011\|0111 |

Compress $msb$'s:

| | |
|---|---|
| $Cb_5^+$ | 0.1110\|1111 |
| $Sb_5^-$ | 0.1011\|0111 |

$R_5=0.1110|1111-0.1011|0111=0.00111 (=0.1100$1$)$-correct!

| Iteration | $2.R^+_{i-1}$ | $2.R^-_{i-1}$ | $q_i$ | $2.Q^+_{i-1}$ | $2.Q^-_{i-1}$ | i (1-hot) | $2^{-i}$ |
|---|---|---|---|---|---|---|---|
| 6 | 1.1101\|1110 | 1.0110\|1110 | 1 | 1.0011\|0000 | 0.0000\|0000 | 0.0000\|1000 | 0.0000\|0100 |

From the earlier worked example, $R_6=0.110001$ $q_i=1 \rightarrow R_i=2 \cdot R_{i-1} 1 \cdot (2Q_{i-1}+\frac{1}{2}^i)=[10.0-1.1001]-[1.0011-0.00]-0.000001$ (3:2) adds of $2 \cdot R^+_{i-1}+2 \cdot R^-_{i-1}-2 \cdot Q^+_{i-1}-2 \cdot Q^-_{i-1}-2^{-i}$

| | |
|---|---|
| $2R_5^+$ | 01.1101\|1110 |
| $2R_5^-$ | 1.0110\|1110 |
| $-2 \cdot Q_5^+$ | 10.1100\|1111 |
| | 1 |
| $Ca_6^+$ | 01.1011\|1111 |
| $Sa_6^-$ | 10.0111\|1111 |
| $-2 \cdot Q_5^-$ | 11.1111\|1011 |
| | 1 |
| = | |
| $Cb_6^+$ | 01.0111\|0111 |
| $Sb_6^-$ | 10.0011\|1011 |

Compress msb's:

| | |
|---|---|
| $Cb_6^+$ | 0.0111\|0111 |
| $Sb_6^-$ | 1.0011\|1011 |

$R_6 = 0.0111|0111 - 1.0011|1011 = -0.110001 (=0.1\underline{1}000\underline{1})$—correct!

| Iteration | $2 \cdot R^+_{i-1}$ | $2 \cdot R^-_{i-1}$ | $q_i$ | $2 \cdot Q^+_{i-1}$ | $2 \cdot Q^-_{i-1}$ | i (1-hot) | $2^{-i}$ |
|---|---|---|---|---|---|---|---|
| 7 | 0.1110\|1110 | 10.0111\|0110 | $\underline{1}$ | 1.0011\|1000 | 0.0000\|0$\underline{0}$00 | 0.0000\|0$\underline{1}$00 | 0.0000\|0010 |

From the earlier worked example, $R_7 = 0.\underline{1}01100\underline{1} = 0.0\underline{1}0$ $\underline{1}001$ $q_i = -1 \rightarrow = 2 \cdot R_{i-1} - 1 \cdot (2Q_{i-1} + -\frac{1}{2^i}) = [0.0-1.1000|1] -- ([1.0011|1-0.00]) - 0.0000|001$ (3:2) adds of $2 \cdot R^+_{i-1} + 2 \cdot R^-_{i-1} - 2 \cdot Q^+_{i-1} - 2 \cdot Q^-_{i-1} - 2^{-i}$

| | |
|---|---|
| $2R_6^+$ | 0.1110\|1110 |
| $2R_6^-$ | 10.0111\|0110 |
| $+2 \cdot Q_6^+$ | 1.0011\|1000 |
| | 0 |
| $Ca_7^+$ | 11.0101\|0000 |
| $Sa_7^-$ | 11.1010\|0000 |
| $+2 \cdot Q_6^-$ | 11.1111\|1101 |
| | 1 |
| = | |
| $Cb_7^+$ | 10.1011\|1011 |
| $Sb_7^-$ | 11.0000\|1101 |

Compress msb's:

| | |
|---|---|
| $Cb_7^+$ | 0.1011\|1011 |
| $Sb_7^-$ | 1.000\|1101 |

$R_7 = 0.1011|1011 - 1.0000|1101 = -0.0101001 (=0.0\underline{1}0$ $\underline{1}00\underline{1})$—correct!

| Iteration | $2 \cdot R^+_{i-1}$ | $2 \cdot R^-_{i-1}$ | $q_i$ | $2 \cdot Q^+_{i-1}$ | $2 \cdot Q^-_{i-1}$ | i (1-hot) | $2^{-i}$ |
|---|---|---|---|---|---|---|---|
| 8 | 1.0111\|0110 | 10.0001\|1010 | 0 | 1.0011\|1000 | 0.0000\|0100 | 0.0000\|00$\underline{1}$0 | 0.0000\|0001 |

From the earlier worked example, $R_8 = 0.\underline{1}0\underline{1}00\underline{1}$ $q_i = 0 \rightarrow R_i = 2 \cdot R_{i-1} = [1.0 - 1.1010|01]$ (3:2) adds of $2 \cdot R^+_{i-1} + 2 \cdot R^-_{i-1} - 2 \cdot Q^+_{i-1} - 2 \cdot Q^-_{i-1} - 2^{-i}$ $2R_7^+$  1.0111|0110
$2R_7^-$  10.0001|1010
+0   0.0000|0000
         0
$Ca_8^+$  10.1100|1000
$Sa_8^-$  11.0110|1100
+0   0.0000|0000
         0
=
$Cb_8^+$  01.0000|0000
$Sb_8^-$  01.1010|0100

Compress msb's:
$Cb_8^+$  0.0000|0000
$Sb_8^-$  0.1010|0100

$R_8 = 0.0000|0000 - 0.1010|0100 = -0.101001 (= 0.\underline{1}0\underline{1}00\underline{1})$—correct!

| Iteration | $2 \cdot R^+_{i-1}$ | $2 \cdot R^-_{i-1}$ | $q_i$ | $2 \cdot Q^+_{i-1}$ | $2 \cdot Q^-_{i-1}$ | i (1-hot) | $2^{-i}$ |
|---|---|---|---|---|---|---|---|
| 9 | 0.0000\|0000 | 1.0100\|1000 | $\underline{1}$ | 1.0011\|1000 | 0.0000\|010$\underline{0}$ | 0.0000\|000$\underline{1}$ | 0.0000\|0000\|1 |

From the earlier worked example, $R_9 = 0.000\underline{1}0\underline{1}00\underline{1}$ $q_i = -1 > R_i = 2 \cdot R_{i-1} - -1 \cdot (2Q_{i-1} + -\frac{1}{2}^i) = [0.0 - 1.0100|1] - [1.0011|1 - 0.0000101] - 0.0000|0000|1$ (3:2) adds of $2 \cdot R^+_{i-1} + 2 \cdot R^-_{i-1} - 2 \cdot Q^+_{i-1} - 2 \cdot Q^-_{i-1} - 2^{-i}$ $2R_8^+$   0.0000|0000|0
$2R_8^-$   1.0100|1000|0
+2·$Q_9^+$  1.0011|1000|0
            0
$Ca_9^+$   00.0110|0000|0
$Sa_9^-$   0.0111|0000|0
+2·$Q_9^-$  11.1111|1011|0
            1
=
$Cb_9^+$   11.1101|0111|0
$Sb_9^-$   11.1110|1011|1

Compress msb's:
$Cb_9^+$   0.1101|0111|0
$Sb_9^-$   0.1110|1011|1

$R_9 = 0.1101|0111|0 - 0.1110|1011|1 = -0.000101001$
$(= 0.000\underline{1}0\underline{1}00\underline{1})$—correct!

$2Q = 1.00111\underline{1}0\underline{1}(000\underline{1} = 1.00110010(111\ldots$

We claim:

1. A data processing apparatus comprising:
combined divide-square root circuitry to perform, in response to a divide instruction identifying a first operand A and a divisor D, a radix-N SRT division algorithm to generate a result value Q=A/D, and to perform, in response to a square root instruction identifying a second operand B, a radix-N SRT square root algorithm to obtain a result value Q=√B, where N is an integer power of 2;
wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and
the combined divide-square root circuitry comprises shared remainder updating circuitry to generate the updated remainder value for a greater number of iterations per processing cycle for the SRT division algorithm than for the SRT square root algorithm;
wherein in the SRT square root algorithm, the $i^{th}$ iteration is for determining the updated remainder value $R_i$ based on the previous remainder value $R_{i-1}$, the quotient value $q_i$ and a partial result value $Q_{i-1}$ corresponding to a combination of the quotient values selected in the preceding iterations;
the partial result value $Q_{i-1}$ is represented in signed-digit format; and
the shared remainder updating circuitry comprises circuitry to perform a calculation for determining the updated remainder value $R_i$ with the partial result value $Q_{i-1}$ remaining in the signed-digit format, when performing the SRT square root algorithm.

2. The data processing apparatus according to claim 1, wherein the shared remainder updating circuitry is to generate the updated remainder value for twice as many iterations per processing cycle for the SRT division algorithm than for the SRT square root algorithm.

3. The data processing apparatus according to claim 1, wherein the combined divide-square root circuitry comprises shared quotient selecting circuitry to select the quotient value based on the previous remainder value, for both the SRT divide algorithm and the SRT square root algorithm.

4. The data processing apparatus according to claim 1, wherein in the SRT division algorithm, the $i^{th}$ iteration is for determining the updated remainder value $R_i$ equivalent to $R_i = N \times (R_{i-1} - q_i \times D)$ or $R_i = N \times R_{i-1} - q_i \times D$.

5. The data processing apparatus according to claim 1, wherein in the SRT square root algorithm, the $i^{th}$ iteration is for determining the updated remainder value $R_i$ equivalent to $R_i = N \times (R_{i-1} - q_i(2Q_{i-1} + q_i/2^i))$ or $R_i = N \times R_{i-1} - q_i(2Q_{i-1} + q_i/2^i)$.

6. The data processing apparatus according to claim 1, wherein the partial result value $Q_{i-1}$ is represented by a first value representing positively-weighted digits of the partial result value and a second value representing negatively-weighted digits of the partial result value; and
the shared remainder updating circuitry comprises a first adding stage to perform an addition or subtraction using the previous remainder value $R_{i-1}$ and one of the first value and the second value, and a second adding stage to perform an addition or subtraction using a result of the first adding stage and the other of the first value and the second value, to generate the updated remainder value $R_i$ at the output of the second adding stage when performing the SRT square root algorithm.

7. The data processing apparatus according to claim 6, wherein when performing the SRT divide algorithm, the first adding stage is to generate the updated remainder value $R_i$ for one iteration, and the second adding stage is to generate the updated remainder value $R_{i+1}$ for a subsequent iteration.

8. The data processing apparatus according to claim 1, wherein the shared remainder updating circuitry comprises at least one remainder updating stage;
each remainder updating stage comprising shared circuitry to output, in response to the previous remainder value $R_{i-1}$ for one iteration:
(i) the updated remainder value $R_{i+1}$ for a subsequent iteration when performing the SRT divide algorithm; and
(ii) the updated remainder value $R_i$ for said one iteration when performing the SRT square root algorithm.

9. The data processing apparatus according to claim 1, wherein the shared remainder updating circuitry comprises at least one remainder updating stage, each remainder updating stage comprising a first adding stage and a second adding stage;
when performing the SRT divide algorithm, the first adding stage is to generate the updated remainder value $R_i$ for one iteration, and the second adding stage is to generate the updated remainder value $R_{i+1}$ for a subsequent iteration; and
when performing the SRT square root algorithm, the first adding stage and the second adding stage are together to generate the updated remainder value $R_i$ for a single iteration.

10. The data processing apparatus according to claim 9, wherein the first adding stage is to perform an addition or subtraction using the previous remainder value $R_{i-1}$ and a second value; and
each remainder updating stage comprises second value selecting circuitry to select as the second value:
(i) a value dependent on the divisor D and the quotient value for said one iteration, when performing the SRT divide algorithm; and
(ii) a value dependent on the quotient values selected for preceding iterations and the quotient value for said single iteration, when performing the SRT square root algorithm.

11. The data processing apparatus according to claim 9, wherein the second adding stage is to perform an addition or subtraction using a result of the first adding stage and a further value; and
each remainder updating stage comprises further value selecting circuitry to select as the further value:
(i) a value dependent on the divisor D and the quotient value for said subsequent iteration, when performing the SRT divide algorithm; and
(ii) a value dependent on the quotient values selected for preceding iterations and the quotient value for said single iteration, when performing the SRT square root algorithm.

12. The data processing apparatus according to claim 9, wherein each remainder updating stage comprises shift circuitry to shift the output of the first adding stage and supply the shifted output to the second adding stage when performing the SRT divide algorithm, and to supply an unshifted output of the first adding stage to the second adding stage when performing the SRT square root algorithm.

13. The data processing apparatus according to claim 9, wherein each remainder updating stage comprises shift circuitry to shift an input of the first adding stage or an output of the second adding stage when performing both the SRT divide algorithm and the SRT square root algorithm.

14. The data processing apparatus according to claim 9, wherein the shared result generating circuitry comprises a plurality of said remainder updating stages.

15. The data processing apparatus according to claim 1, comprising result generating circuitry to generate the result value Q based on the quotient values selected in said plurality of iterations.

16. The data processing apparatus according to claim 1, wherein N=2.

17. A data processing apparatus comprising:
combined divide-square root means for performing, in response to a divide instruction identifying a first operand A and a divisor D, a radix-N SRT division algorithm to generate a result value Q=A/D, and for performing, in response to a square root instruction identifying a second operand B, a radix-N SRT square root algorithm to obtain a result value Q=$\sqrt{B}$, where N is an integer power of 2;
wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and
the combined divide-square root means comprises shared remainder updating means for generating the updated remainder value for a greater number of iterations per processing cycle for the SRT division algorithm than for the SRT square root algorithm;
wherein in the SRT square root algorithm, the $i^{th}$ iteration is for determining the updated remainder value $R_i$ based on the previous remainder value $R_{i-1}$, the quotient value $q_i$ and a partial result value $Q_{i-1}$ corresponding to a combination of the quotient values selected in the preceding iterations;
the partial result value $Q_{i-1}$ is represented in signed-digit format; and
the shared remainder updating means comprises means for performing a calculation for determining the updated remainder value $R_i$ with the partial result value $Q_{i-1}$ remaining in the signed-digit format, when performing the SRT square root algorithm.

18. A data processing method comprising:
in response to a divide instruction identifying a first operand A and a divisor D, performing a radix-N SRT division algorithm to generate a result value Q=A/D, where N is an integer power of 2; and
in response to a square root instruction identifying a second operand B, performing a radix-N SRT square root algorithm to obtain a result value Q=$\sqrt{B}$;
wherein the SRT division algorithm and the SRT square root algorithm each comprise a plurality of iterations, each iteration for determining an updated remainder value $R_i$ based on a quotient value $q_i$ selected for that iteration in dependence on a previous remainder value $R_{i-1}$, the updated remainder value from one iteration becoming the previous remainder value for a following iteration, and the result value Q being derivable from the quotient values selected for the plurality of iterations; and shared remainder updating circuitry is used to generate the updated remainder value $R_i$, with the shared remainder updating circuitry generating the updated remainder value for a greater number of iterations per processing cycle for the SRT division algorithm than for the SRT square root algorithm;

wherein in the SRT square root algorithm, the $i^{th}$ iteration is for determining the updated remainder value $R_i$ based on the previous remainder value $R_{i-1}$, the quotient value $q_i$ and a partial result value $Q_{i-1}$ corresponding to a combination of the quotient values selected in the preceding iterations;

the partial result value $Q_{i-1}$ is represented in signed-digit format; and a calculation for determining the updated remainder value $R_i$ is performed with the partial result value $Q_{i-1}$ remaining in the signed-digit format, when performing the SRT square root algorithm.

* * * * *